US006685098B2

(12) United States Patent
Okano et al.

(10) Patent No.: US 6,685,098 B2
(45) Date of Patent: Feb. 3, 2004

(54) SETBACK TIMER OF AIR CONDITIONER, AIR CONDITIONING SYSTEM, AND METHOD OF SETTING SETBACK TIMER DISPLAY

(75) Inventors: Takashi Okano, Osaka (JP); Hisashi Sumida, Osaka (JP); Kentaro Niki, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 2 days.

(21) Appl. No.: 10/169,503

(22) PCT Filed: Oct. 16, 2001

(86) PCT No.: PCT/JP01/09086

§ 371 (c)(1),
(2), (4) Date: Jul. 3, 2002

(87) PCT Pub. No.: WO02/33327

PCT Pub. Date: Apr. 25, 2002

(65) Prior Publication Data

US 2003/0000692 A1 Jan. 2, 2003

(30) Foreign Application Priority Data

Oct. 16, 2000 (JP) ....................................... 2000-314910

(51) Int. Cl.[7] ........................... G05D 23/00; F24F 11/00
(52) U.S. Cl. .......................................... 236/47; 165/238
(58) Field of Search ................................ 236/47, 46 R, 236/94; 165/11.1, 238

(56) References Cited

U.S. PATENT DOCUMENTS 4,373,664 A * 2/1983 Barker et al. ............. 236/46 R
4,606,401 A * 8/1986 Levine et al. ................. 236/94

FOREIGN PATENT DOCUMENTS

JP 60-91286 5/1985
JP 62-266348 11/1987

* cited by examiner

*Primary Examiner*—William Wayner
(74) *Attorney, Agent, or Firm*—Nixon Peabody LLP; Donald R. Studebaker

(57) ABSTRACT

A set back timer for an air conditioner is provided with a display screen (15) for the representation of information about normal and set back operations of the air conditioner, wherein a normal operation time period display (53) indicating a time period of the day during which period a normal operation is carried out and a set back time period display (64) indicating a time period in the normal operation time period during which period a set back operation is carried out are displayed independently of each other on the display screen (15). Such arrangement enables an air conditioner user to easily and correctly confirm, at a glance, the relationship between a normal operation time period and a set back operation time period in the normal operation time period for the day, and the contents of a setting can be confirmed remarkably easily, thereby contributing to improvements in air conditioner operability.

11 Claims, 4 Drawing Sheets

SETBACK TIMER OF AIR CONDITIONER, AIR CONDITIONING SYSTEM, AND METHOD OF SETTING SETBACK TIMER DISPLAY

TECHNICAL FIELD

The present invention relates to an air conditioner set back timer, to an air conditioning system formed by combining such a set back timer and an air conditioner, and to a set back timer display setting method.

BACKGROUND ART

In a typical air conditioner its operating conditions (for example, air conditioning elements such as the amount of air delivery, the direction of wind, and the like) are set by a remote controller provided to an indoor unit, when cooling and heating modes of operation are provided by air conditioned wind delivered from the indoor unit. In addition to the remote controller, a set back timer is provided by which a time period in the day, during which period a normal air conditioning operation is carried out based on a given set temperature, is set (that is, "setting when to start and stop the operation of the air conditioner in the day"), and a time period in the normal air conditioning operation time, during which period a set back operation is carried out, is set (that is, "setting when to perform a control operation for temperature shifting from the set temperature to a preprogrammed set back temperature according to a preselected time of the day so that the air conditioner operates based on the set back temperature). By virtue of execution of such a set back operation, energy saving modes of operation are realized.

Apart from the above, a set back timer is a timer through which a user performs program operations while confirming the contents of a setting. Accordingly, it is required that the contents of a setting and the change in setting be confirmed easily and correctly.

However, conventional set back timers have for example the following drawbacks.

(a) A display of the contents of a setting in a time period in the day is vertically and dividedly displayed in two upper and lower sections. Accordingly, the user may find it difficult to confirm not only the connection of time periods but also a time period that has been set.

(b) A display of a time period is displayed in three hours. Accordingly, time confirmation may be difficult because such a time displaying manner differs from a normal sense of time.

(c) It is arranged in conventional set back timers such that a time period display and a temperature display in a normal operation, and a time period display and a temperature display in a set back operation are selectively displayed using a single time period displaying area and a single temperature displaying area. In addition, it is arranged such that a user can tell the difference between normal operation time period and temperature displays and set back operation time period and temperature displays from such arrangement that each normal operation display is displayed in its "lighting" state when a normal operation is being carried out while when a set back operation is being carried out each set back operation display is displayed in its "flashing" state. Accordingly, the user may find it difficult to confirm the contents of a display, especially during the set back operation. Furthermore, it is impossible for the user to confirm both the contents of a normal operation display and the contents of a set back operation display at the same time, thereby causing the user operational inconveniences.

(d) Although it is common that each day of the week is displayed by their first three letters, each day of the week is displayed by its initial letter in conventional set back timers. Accordingly, the user may find it difficult to confirm the days of the week.

Bearing in mind the above described drawbacks with the conventional set back timers, the present invention was made. Accordingly, a major object of the present invention is to enhance the ease and certainty of confirming the contents of a setting by contriving the way of displaying the contents of a setting in an air conditioner set back timer.

DISCLOSURE OF THE INVENTION

In order to achieve the above object, the present invention employs the following configurations as concrete means for providing solutions to the foregoing problems.

A first invention of the present application is a set back timer for an air conditioner for performing control operations so that there is a temperature shift to a second set temperature only in a specified time period in a time period during which period a normal operation is carried out based on a first set temperature. The air conditioner set back timer of the first invention comprises a display screen (15) for the representation of information about normal and set back operations of the air conditioner, wherein a normal operation time period display (53) indicating a time period of the day during which period a normal operation is carried out and a set back time period display (64) indicating a time period in the normal operation time period during which period a set back operation is carried out are displayed independently of each other on the display screen (15).

In a second invention of the present application, the air conditioner set back timer of the first invention is characterized in that the set back time period display (64) is displayed adjacently to the normal operation time period display (53).

In a third invention of the present application, the air conditioner set back timer of the first invention is characterized in that the set back time period display (64) is displayed in the vicinity of the normal operation time period display (53).

In a fourth invention of the present application, the air conditioner set back timer of any one of the first to third inventions is characterized in that the normal operation time period display (53) and the set back time period display (64) are each displayed in a bar chart-like display manner in which time periods of the day are continuously represented.

In a fifth invention of the present application, the air conditioner set back timer of any one of the first to fourth inventions is characterized in that the normal operation time period display (53) and the set back time period display (64) are made contrastable with each other by hour.

In a sixth invention of the present application, the air conditioner set back timer of any one of the first to fifth inventions is characterized in that the normal operation time period display (53) and the set back time period display (64) are provided with time indexes (54) and (65), respectively, for every two hours.

In a seventh invention of the present application, the air conditioner set back timer of any one of the first to sixth inventions is characterized in that the first set temperature (52) and the second set temperature (63) are displayed in the vicinity of the normal operation time period display (53) and in the vicinity of the set back time period display (64), respectively.

In an eighth invention of the present application, the air conditioner set back timer of the first invention is characterized in that a day display (44) is displayed on the display screen (15) which indicates the presence or absence of an air conditioner operation for each day of the week.

In a ninth invention of the present application, the air conditioner set back timer of the eighth invention is characterized in that the day display (44) displays each day of the week by its first three letters.

A tenth invention of the present application is an air conditioning system formed by combining any one of the air conditioner set back timers of the first to ninth inventions and an air conditioner.

An eleventh invention of the present application is a display setting method for a set back timer of an air conditioner wherein the set back timer performs control operations so that there is a temperature shift to a second set temperature only in a specified time period in a time period during which period a normal operation is carried out based on a first set temperature, the method comprising the step of independently displaying a normal operation time period display (53) indicating a time period of the day during which period a normal operation is carried out and a set back time period display (64) indicating a time period in the normal operation time period during which period a set back operation is carried out, on a display screen (15) of the set back timer for the representation of information about normal and set back operations of the air conditioner.

The present invention employs the aforementioned configurations, and the following effects will be obtained.

(1) In accordance with the first and eleventh inventions of the present application, the air conditioner set back timer, which performs control operations so that there is a temperature shift to a second set temperature only in a specified time period in a time period during which period a normal operation is carried out based on a first set temperature, is provided with the display screen (15) for the representation of information about normal and set back operations of the air conditioner, wherein the normal operation time period display (53) indicating a time period of the day during which period a normal operation is carried out and the set back time period display (64) indicating a time period in the normal operation time period during which period a set back operation is carried out are displayed independently of each other on the display screen (15). Such arrangement makes it possible for a user to be able to easily and correctly confirm, at a glance, both a normal operation time period and a set back operation time period in the normal operation time period, thereby remarkably improving the certainty and ease of confirming the contents of a setting. This contributes to providing improvements in air conditioner operability.

(2) In accordance with the second invention of the present application, in the air conditioner set back timer of the first invention the set back time period display (64) is displayed adjacently to the normal operation time period display (53). Such arrangement allows a user to quickly and easily grasp, at a glance, a normal operation time period versus set back time period relationship while contrasting these time periods, thereby further speeding up the effect of (1).

(3) In accordance with the third invention of the present application, in the air conditioner set back timer of the first invention the set back time period display (64) is displayed in the vicinity of the normal operation time period display (53). Such arrangement allows a user to quickly and easily grasp, at a glance, a normal operation time period versus set back time period relationship while contrasting these time periods, thereby further speeding up the effect of (1).

(4) In accordance with the fourth invention of the present application, in the air conditioner set back timer of any one of the first to third inventions the normal operation time period display (53) and the set back time period display (64) are each displayed in a bar chart-like display manner in which time periods of the day are continuously represented. As a result of such arrangement, a normal operation time period and a set back time period can be confirmed easily with time at a glance, thereby speeding up the effect of (1), (2), or (3).

(5) In accordance with the fifth invention of the present application, in the air conditioner set back timer of any one of the first to fourth inventions the normal operation time period display (53) and the set back time period display (64) are made contrastable with each other by hour. Such arrangement allows a user to more easily confirm a normal operation time period versus set back time period relationship, thereby further speeding up the effect of (1), (2), (3), or (4).

(6) In accordance with the sixth invention of the present application, in the air conditioner set back timer of any one of the first to fifth inventions the normal operation time period display (53) and the set back time period display (64) are provided with time indexes (54) and (65), respectively, for every two hours. Such time indexing for every two hours is a common time displaying manner and provides an easy way of grasping the ratio of a certain time period to the day, thereby allowing a user to easily and correctly confirm the contents of a setting in the day. The effect of (1), (2), (3), (4), or (5) is further sped up.

(7) In accordance with the seventh invention of the present application, in the air conditioner set back timer of any one of the first to sixth inventions the first set temperature (52) and the second set temperature (63) are displayed in the vicinity of the normal operation time period display (53) and in the vicinity of the set back time period display (64), respectively. Such arrangement allows a user to easily confirm a normal operation time period versus its set temperature (52) relationship and a set back time period versus its set back temperature (63) relationship at a glance, and the effect of (1), (2), (3), (4), (5), or (6) becomes more significant.

(8) In accordance with the eighth invention of the present application, in the air conditioner set back timer of the first invention the day display (44) which indicates the presence or absence of an air conditioner operation for each day of the week and the clock display (46) which indicates a present time are displayed on the display screen (15). Such arrangement allows a user to easily confirm the presence or absence of an air conditioner operation for each day of the week, thereby further speeding up the effect of (1).

(9) In accordance with the ninth invention of the present application, in the air condition set back timer of the eighth invention the day display (44) displays each day of the week by its first three letters. In comparison with for example a case in which each day of the week is displayed by its initial letter, the day display (44) allows a user to visually easily confirm the days of the week, thereby further enhancing the effect of (8).

(10) The tenth invention of the present application is an air conditioning system formed by combining any one of the air conditioner set back timers of the first to ninth inventions and an air conditioner. Such an air conditioning system provides the effect of (1), (2), (3), (4), (5), (6), (7), (8), or (9).

BEST MODE FOR CARRYING OUT THE INVENTION

Referring to the Figures, a best mode for embodying the present invention will be described as an exemplary embodiment thereof.

Figure 1:
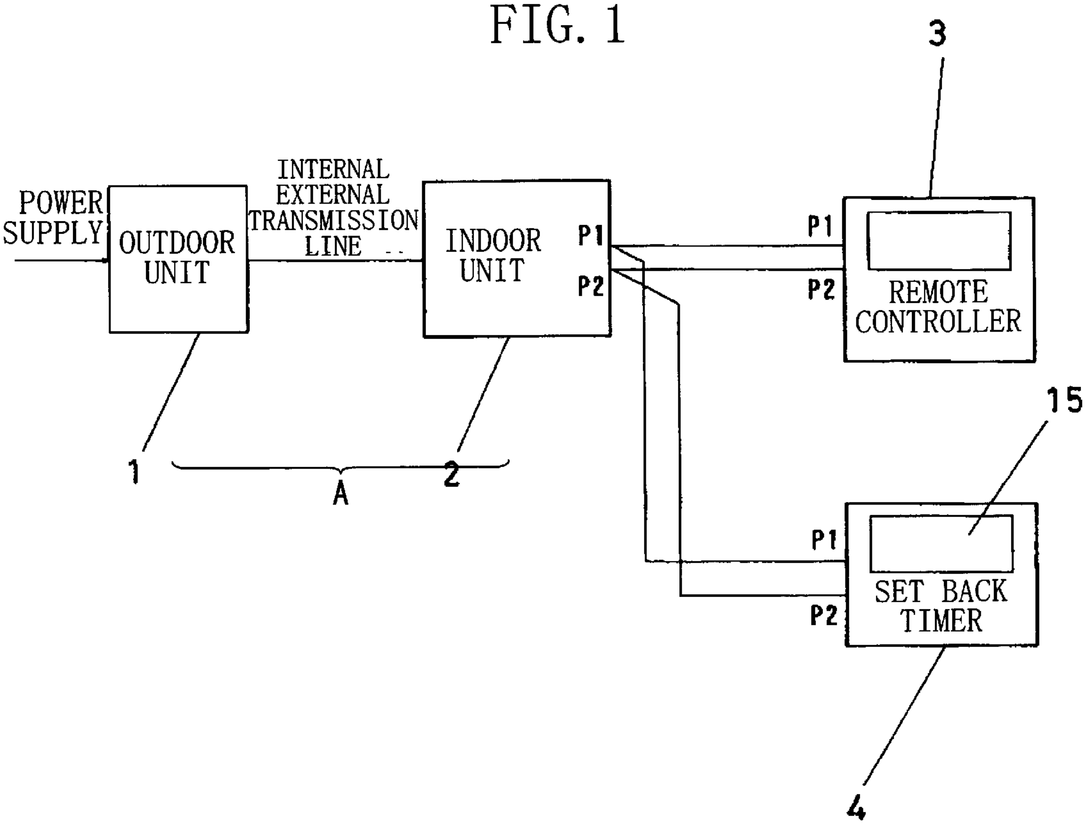
FIG. 1 is a diagram roughly showing a control system of an air conditioning system according to an exemplary embodiment of the present invention.

Referring first to FIG. 1, there is shown an arrangement of a control system of a separate type air conditioning system according to an exemplary embodiment of the present invention. The air conditioning system comprises an air conditioner A made up of an outdoor unit 1 and an indoor unit 2. The units 1 and 2 are electrically interconnected by an internal external transmission line. Connected in parallel to the indoor unit 2 are a remote controller 3 and a set back timer 4.

The user operates the remote controller 3 to set and change air conditioning characteristics according to his or her desire. For example, the amount of air delivery and the direction of wind can be set and changed through the remote controller 3.

The set back timer 4 is an essential point of the present invention by which normal operation time periods and set temperatures thereof, and set back operation time periods and set temperatures thereof are set. For these settings, not only setting operation convenience but also easy confirmation of the contents of each setting are required.

In order to meet such requirements, the set back timer 4 of the present embodiment employs a novel configuration with respect to its display manner and technique for facilitating confirming, especially the contents of each setting. Hereinafter, the set back timer 4 and its concrete configuration will be described in greater detail.

The set back operation is an operation which is performed only in a specified time period in a time period of the day during which period a normal operation is carried out based on a given "set temperature", at "set back temperatures" higher than the given set temperature (in cooling modes of operation) or at "set back temperatures" lower than the given set temperature (in heating modes of operation).

Figure 2:
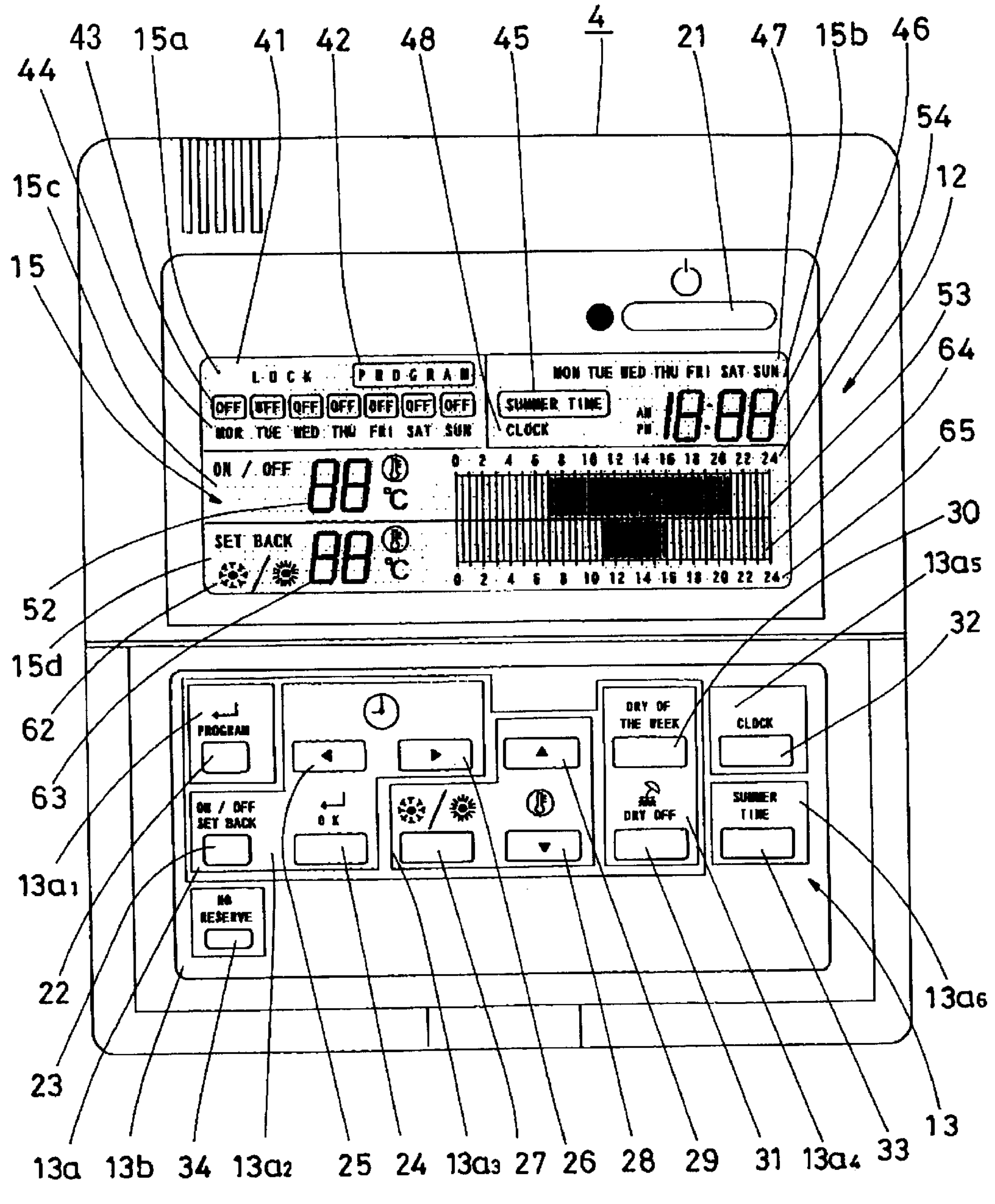
FIG. 2 is a front view of a set back timer.
Figure 3:
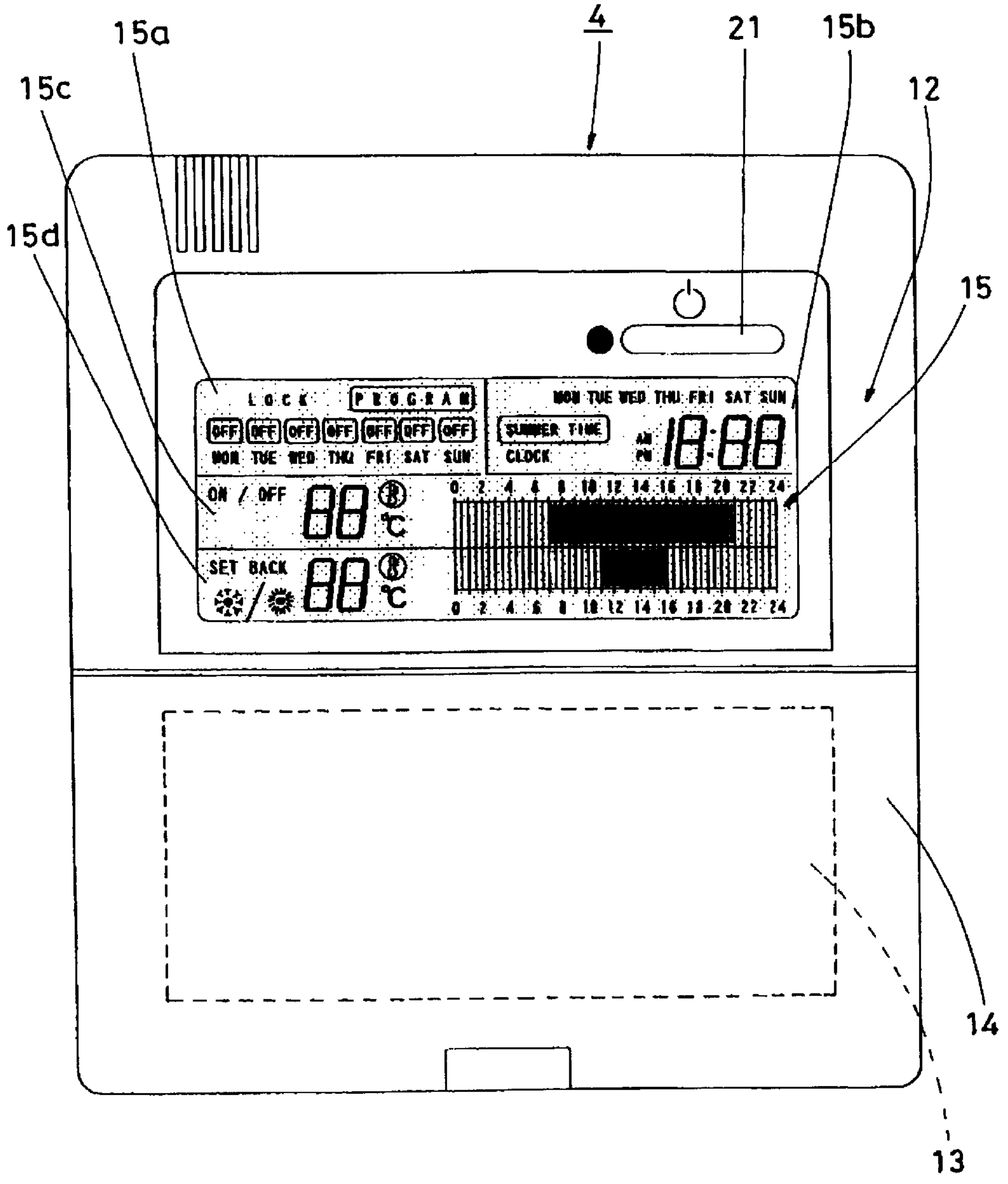
FIG. 3 is a front view of the set back timer with a cover mounted thereon.
Figure 4:
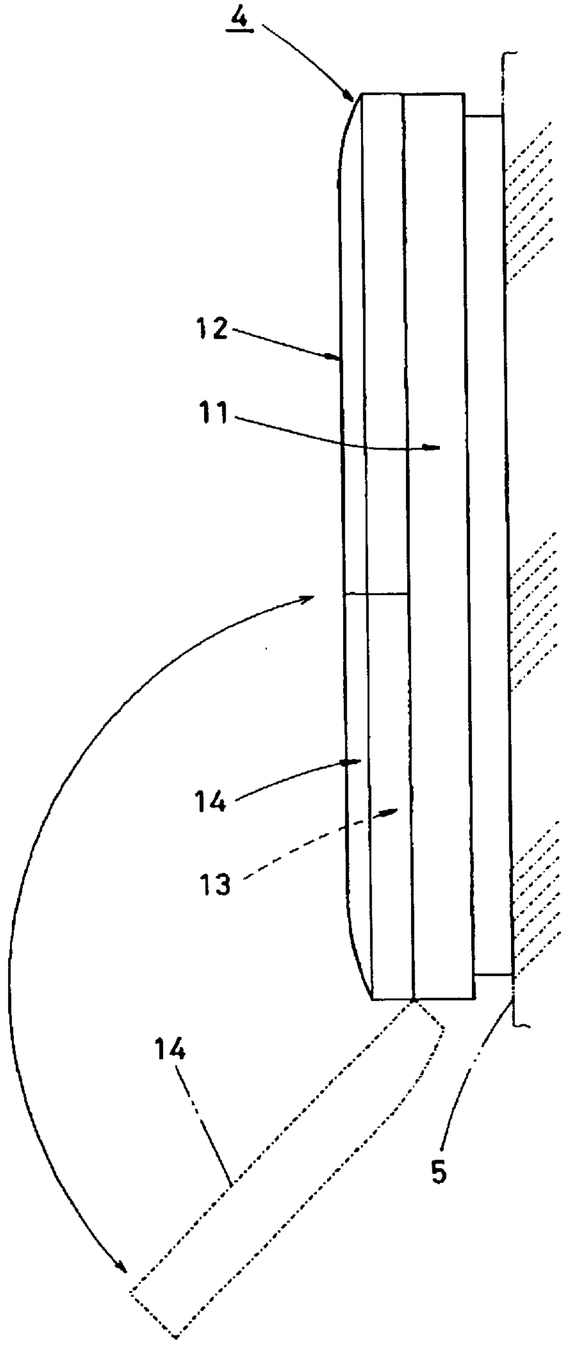
FIG. 4 is a side view of the set back timer.

As shown in FIGS. 2–4, a user operates the set back timer 4 attached to an indoor wall surface 5 (see for example FIG. 4), and the set back timer 4 has an external appearance of rectangular thin plate shape. A display part 12 and a control part 13 are provided in an upper and a lower part of the set back timer 4, respectively.

Configuration of the Display Part 12

The display part 12 displays information about normal and set back operations and has, at its front side, a display screen 15 having an oblong rectangular plane shape. The display screen 15 is implemented by for example a liquid crystal screen, and comprises four divided display areas, namely a first display area **15*a* occupying a left-hand side half of an upper one-third region of the display screen 15, a second display area 15*b* occupying a right-hand side half of the upper one-third region of the display screen 15, a third display area 15*c* of oblong rectangular shape underlying the first and second display areas 15*a* and 15*b* and occupying approximately an intermediate one-third region of the display screen 15, and a fourth display area 15*d* of oblong shape occupying a lower one-third region of the display screen 15**.

The first display area **15*a* has, at its uppermost section, a lock display 41 which is switched on and off and a program setting display 42 which is switched on and off. Further, seven ON/OFF displays 43 which are switched on and off are provided at the intermediate section, and seven day indexes 44, which are associated with the seven ON/OFF displays 43**, respectively, are provided at the lowermost section.

The day indexes 44 display the seven days of the week, respectively, and each day is displayed by its first three letters such as "MON", "TUE" and so forth in order to provide improved day recognition. Further, each of the ON/OFF displays 43 (which are associated with the seven days of the week indicated by the day indexes 44) indicates "PERFORM AN AIR CONDITIONING OPERATION" when "ON" goes on and indicates "NO AIR CONDITIONING OPERATION" when "OFF" goes on.

The second display area **15*b* has a day display 47 indicating a present day of the week, a summer time setting display 45 indicating a summer time setting, a clock setting display 48 displaying a time setting, and a clock display 46 indicating a present time. That is, the second display area 15*b*** collectively displays present operational information.

The third display area **15*c* is a display area for the representation of information about a normal operation. More specifically, the left-hand side half of the third display area 15*c* is a normal operation set temperature 52. Note that this "set temperature" corresponds to a "first set temperature" as described in the attached claims. On the other hand, the right-hand side half of the third display area 15*c* is a normal operation time period display 53 in which time periods of the day are displayed in a single continuous bar chart-like display manner. Further, the normal operation time period display 53 is provided with time divisional lines for every thirty minutes. Time indexes 54 are provided every two hours, overlying the time divisional lines. In the normal operation time period display 53**, a specified time period of the day, during which period a normal operation is carried out (i.e., a time period from the time the normal operation is to be started up to the time the normal operation is to be stopped), is lighted to be displayed.

The fourth display area **15*d* is a display area for the representation of information about a set back operation. More specifically, an operation switching display 62 indicating operation switching between the cooling mode operation and the heating mode operation, and a set back temperature 63 which is a set back operation set temperature (i.e. this "set back temperature" corresponds to a "second set temperature" as described in the attached claims) are provided in a left-hand side half of the fourth display area 15*d*. On the other hand, a right-hand side half of the fourth display area 15*d* is a set back time period display 64 in which time periods of the day are displayed in a single continuous bar chart-like display manner. Further, the set back time period display 64 is provided with time divisional lines for every thirty minutes. Time indexes 54 are provided for every two hours, overlying the time divisional lines. In the set back time period display 64**, a specified time period of the day, during which period a set back operation is carried out (i.e., a time period from the time the normal operation is to be started up to the time the normal operation is to be stopped), is lighted to be displayed.

In FIG. 2, the reference numeral 21 denotes an operation switch.

Configuration of the Control Part 13

The control part 13, which is a part through which input operations, such as inputting a temperature setting, a time setting, and other settings for normal and set back operations, includes various control buttons which will be described later.

The button panel area of the control part 13 is divided into an upper panel part 13*a* occupying approximately the upper two-thirds of the control part 13 and a lower panel part 13*b* occupying the lower one-third of the control part 13.

Further, the upper panel part 13*a* is laterally divided into six subparts, namely a first subpart 13*a*1 located at the upper left-hand side corner, a second subpart 13*a*2 underlying the first subpart 13*a*1 and extending up to the right-hand side of the first subpart 13*a*1, a third subpart 13*a*3 located on the right-hand side of the second subpart 13*a*2, a fourth subpart 13*a*4 located on the right-hand side of the third subpart 13*a*3, and a fifth subpart 13*a*5 located at the upper right-hand side corner, and a sixth subpart 13*a*6 located at the lower right-hand side corner.

The first subpart 13*a*1 is provided with a program button 22 which is the most frequently operated button when setting operations.

The second subpart 13*a*2 is a part for time setting (i.e., operation time period setting for normal and set back operations). The second subpart 13*a*2 includes an operation selection button 23 for switching between the normal operation and the set back operation, a decision button 24, a time retarding button 25 for the setting of a time, and a time advancing button 26 for the setting of a time. The contents of settings input through the buttons 23–26 of the second subpart 13*a*2 are displayed in the normal operation time period display 53 and set back time period display 64 of the display part 12.

The third subpart 13*a*3 is a part for the setting of a temperature. The third subpart 13*a*3 includes an operation switching button 27, a downward temperature button 28, and an upward temperature button 29. The contents of settings input through the buttons 27–29 of the third subpart 13*a*3 are displayed on the display part 12 as the set temperature 52 and as the set back temperature 63.

The fourth subpart 13*a*4 is a part for the setting of a holiday for each day of the week. The fourth subpart 13*a*4 includes a day selecting button 30 and a holiday setting button 31. The contents of settings input through the buttons 30 and 31 of the fourth subpart 13*a*4 are displayed as the ON/OFF display 43 on the display part 12.

The fifth subpart 13*a*5 includes a clock button 32 for time adjustment. The sixth subpart 13*a*6 includes a summer time button 33 for summer time setting. When the clock button 32 is operated, the clock setting display 48 of the display part 12 is lighted to be displayed, and a present time thus set is displayed as the clock display 46. On the other hand, when the summer time button 33 is operated, the summer time setting display 45 of the display part 12 is lighted to be displayed, and a summer time thus set is displayed as the clock display 46.

The lower panel part 13*b* includes a cancel button 34 for canceling the contents of a setting input through each of the foregoing buttons.

As described above, in accordance with the set back timer 4 provided with the display part 12 and the control part 13, the contents of a setting inputted on the side of the control part 13 are displayed in a corresponding display area on the side of the display part 12, and if the manner of displaying the contents of a setting on the display part 12 and the method of displaying the contents of a setting on the display part 12 are set in the way as described above, this makes it possible to provide the following characteristic operation/effects.

In accordance with the set back timer 4 of the present exemplary embodiment, the normal operation time period display 53 indicating a time period of the day during which period an air conditioning operation is carried out based on a given set temperature, and the set back time period display 64 indicating a time period of the day during which period a set back control operation is carried out are displayed independently of each other on the display screen 15. This makes it possible to enable a user to easily confirm each of the normal and set back operation time periods. Additionally, these two operation time period displays 53 and 64 are displayed vertically adjacently to each other, thereby enabling a user to contrast them by hour. This therefore allows the user to easily and correctly confirm, at a glance, the relationship between a normal operation time period and a time period of the day during which period a set back operation is carried out, in association with the times of the day. This remarkably improves the confirmability of the contents of a setting and the ease of confirming the contents of a setting in the display part 12, and improvements in the operability of the air conditioner A provided with the set back timer 4 can be expected.

Further, in the foregoing case, the normal operation time period display 53 and the set back time period display 64 are displayed adjacently to each other in such a display manner that each display 53 and 64 is displayed in the form of a single continuous bar chart, thereby allowing a user to contrast them by hour. For example, in comparison with a conventional case in which the time periods of the day are divided into two sections and each section is displayed in a bar chart-like display manner, thereby further facilitating grasping and confirming an operation time period of the day.

Furthermore, the normal operation time period display 53 and the set back time period display 64 are provided with the time indexes 54 for every two hours and with the time indexes 65 for every two hours, respectively. Such time indexes provided for every two hours are a typical way of displaying the hours of the day and facilitate grasping the ratio of a certain time period to the day. Accordingly, in comparison with conventional time indexes provided for every three hours, the contents of a setting can be confirmed more easily and correctly.

Additionally, the normal operation set temperature 52 is displayed in the vicinity of the normal operation time period display 53, whereas the set back operation set temperature 63 is displayed in the vicinity of the set back time period display 64. As a result of such arrangement, a user is allowed to easily confirm, at a glance, a normal operation time period versus its set temperature relationship as well as a set back operation time period versus its set temperature relationship. Each of the foregoing effects becomes more significant.

In accordance with the set back timer 4 of the present exemplary embodiment, the day display 44 indicating the presence or absence of an operation control setting for each day of the week and the clock display 46 indicating a present time are displayed in the display screen 15. Such arrangement facilitates the contrasting between the presence or absence of an operation control setting for each day of the week and the contents of a set back control operation if performed (a time and a set temperature) and the contrasting between a current time and either a normal operation time period or a set back operation time period. For example, such arrangement facilitates judging how much time will be left until the time a set back control operation is started. Further, in this case, the day display 44 displays each day of the week by its first three letters. In comparison with a case in which each day of the week is displayed by its initial letter, the day display 44 provides better visual confirmability of the days of the week, and the display screen 15 provides further improved cofirmability.

INDUSTRIAL APPLICABILITY

The air conditioner set back timer of the present invention has a display screen for the representation of information about normal and set back operations. In the display screen, a normal operation time period display indicating a time period of the day during which period a normal operation is carried out, and a set back time period display indicating a time period in the normal operation time period during which period a set back operation is carried out are displayed independently of each other. This enables a user to easily and correctly confirm, at a glance, a normal operation time period and a set back operation time period in the normal operation time period, thereby remarkably improving the confirmability of the contents of a setting and the ease of confirming the contents of a setting. Therefore, the present invention has high industrial applicability because it can provide especially remarkable effects contributable also to improvements in air conditioner operability.

What is claimed is:

1. A set back timer for an air conditioner for performing control operations so that there is a temperature shift to a second set temperature only in a specified time period in a time period during which period a normal operation is carried out based on a first set temperature, said air conditioner set back timer comprising:

a display screen (15) for the representation of information about normal and set back operations of said air conditioner, wherein a normal operation time period display (53) indicating a time period of the day during which period a normal operation is carried out and a set back time period display (64) indicating a time period in said normal operation time period during which period a set back operation is carried out are displayed independently of each other on said display screen (15).

2. The air conditioner set back timer of claim 1, wherein said set back time period display (64) is displayed adjacently to said normal operation time period display (53).

3. The air conditioner set back timer of claim 1, wherein said set back time period display (64) is displayed in the vicinity of said normal operation time period display (53).

4. The air conditioner set back timer of any one of claims 1–3, wherein said normal operation time period display (53) and said set back time period display (64) are each displayed in a bar chart-like display manner in which time periods of the day are continuously represented.

5. The air conditioner set back timer of claim 1, wherein said normal operation time period display (53) and said set back time period display (64) are made contrastable with each other by hour.

6. The air conditioner set back timer of claim 1, wherein said normal operation time period display (53) and said set back time period display (64) are provided with time indexes (54) and (65), respectively, for every two hours.

7. The air conditioner set back timer of claim 1, wherein said first set temperature (52) and said second set temperature (63) are displayed in the vicinity of said normal operation time period display (53) and in the vicinity of said set back time period display (64), respectively.

8. The air conditioner set back timer of claim 1, wherein a day display (44) is displayed on said display screen (15) which indicates the presence or absence of an air conditioner operation for each day of the week.

9. The air conditioner set back timer of claim 8, wherein said day display (44) displays each day of the week by its first three letters.

10. An air conditioning system formed by combining any one of said air conditioner set back timers of claim 1 and an air conditioner.

11. A display setting method for a set back timer of an air conditioner wherein said set back timer performs control operations so that there is a temperature shift to a second set temperature only in a specified time period in a time period during which period a normal operation is carried out based on a first set temperature, said method comprising the step of:

independently displaying a normal operation time period display (53) indicating a time period of the day during which period a normal operation is carried out and a set back time period display (64) indicating a time period in said normal operation time period during which period a set back operation is carried out, on a display screen (15) of said set back timer for the representation of information about normal and set back operations of said air conditioner.

* * * * *